United States Patent [19]
Talbot et al.

[11] Patent Number: 5,234,519
[45] Date of Patent: Aug. 10, 1993

[54] VENEER PROFILE WRAPPING METHOD AND PRODUCT

[75] Inventors: Charles T. Talbot, Portage; Patrick K. Donahue, Superior, both of Wis.

[73] Assignee: Glen Oak Lumber and Milling, Inc., Montello, Wis.

[21] Appl. No.: 657,722

[22] Filed: Feb. 19, 1991

[51] Int. Cl.$^5$ ............................................. B32B 3/04
[52] U.S. Cl. .................................... 156/212; 34/9.5; 34/16.5; 144/348; 144/349; 144/352; 156/154; 156/216; 156/273.5; 156/281; 156/307.5; 156/331.4; 156/332
[58] Field of Search ............... 156/154, 281, 212, 216, 156/273.5, 307.5, 331.4, 332; 144/348, 352, 349; 34/16.5, 9.5; 427/351

[56] References Cited

U.S. PATENT DOCUMENTS

| | | |
|---|---|---|
| 1,628,886 | 5/1927 | Jackson et al. |
| 2,435,209 | 2/1948 | Elmendorf ........................... 156/281 |
| 3,011,932 | 12/1961 | Downing ............................ 154/45.9 |
| 3,160,543 | 12/1964 | Elmendorf ........................... 156/306 |
| 3,541,592 | 11/1970 | Lewis ................................... 156/212 |
| 3,586,689 | 6/1971 | Nickerson et al. ................... 156/332 |
| 3,841,369 | 10/1974 | Roche .................................. 144/136 |
| 4,447,842 | 5/1984 | Valerio et al. ....................... 156/212 |
| 4,483,730 | 11/1984 | Honda ................................. 156/242 |
| 4,678,532 | 7/1987 | Perry et al. ......................... 156/314 |
| 4,853,061 | 8/1989 | Leung ................................. 156/216 |
| 5,032,206 | 7/1991 | Sigerist .............................. 144/352 |

Primary Examiner—John J. Gallagher
Attorney, Agent, or Firm—Lathrop & Clark

[57] ABSTRACT

A veneer profile wrapping process employs a water-base polyvinylacetate glue system which is activated before application with an acid catalyst. The glue is applied to the veneer by a roller applicator. The veneer is transported on a vacuum belt which prevents the veneer from warping while the glue is dried with fans and infrared radiation. The process employs a porous substrate, such as particle board, which is heated by infrared radiation on all sides. Polyvinylacetate glue is applied to the surface of the substrate, which will be wrapped with veneer and the heat of the substrate plus additional infrared radiation and fans evaporates and dries the glue. The glue on the substrate is dried for approximately 60 to 90 seconds and on the veneer for approximately 10-15 seconds on cross feed drying lines. The veneer is inverted on a side belt changer and forced into intimate contact with the substrate by heated metal rollers. Rubber rollers apply pressure and heat guns and infrared lamps apply process heat which rapidly bonds the veneer to the substrate, producing a bond with high green strength which may be almost immediately sanded or milled. This process produces a veneer-wrapped molding with a glue line impervious to moisture.

10 Claims, 3 Drawing Sheets

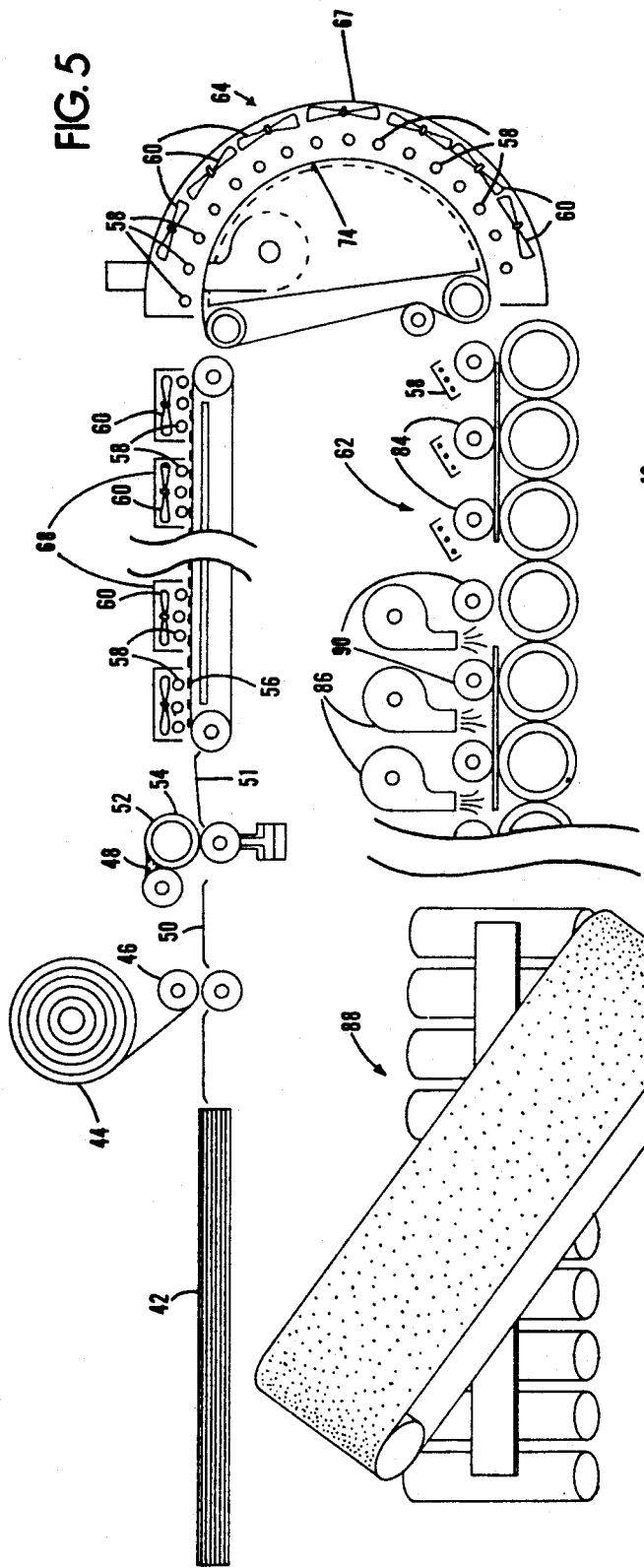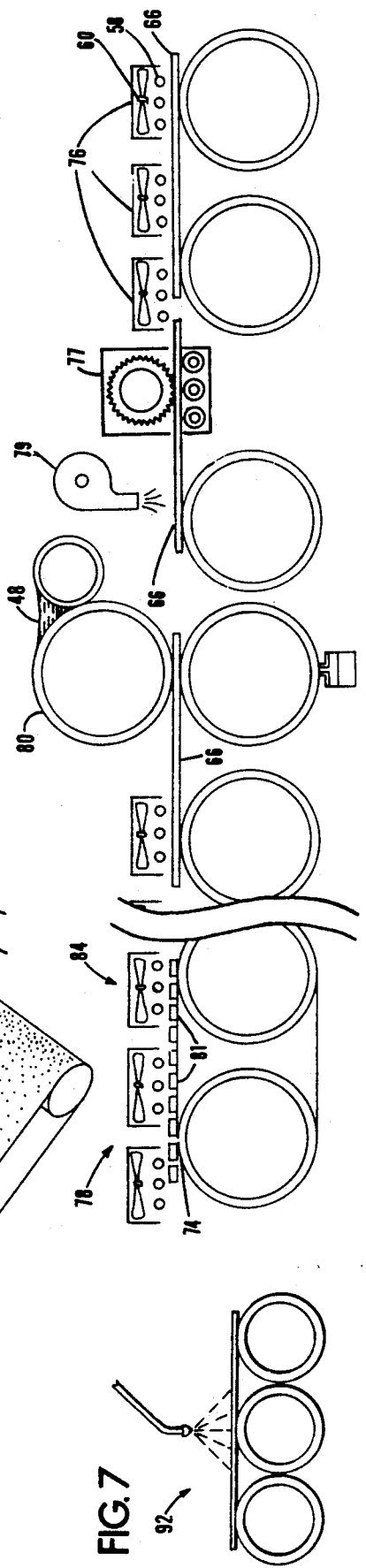

VENEER PROFILE WRAPPING METHOD AND PRODUCT

FIELD OF THE INVENTION

This invention relates to veneer profile wrapping methods an the veneer-wrapped products produced thereby in general and to veneer profile wrapping methods employing water-base glues and the product produced thereby in particular.

BACKGROUND OF THE INVENTION

Solid wood moldings, such as those used around doors and windows, are expensive. When it is desirable to have a natural wood finished molding, and it is desired to employ hardwoods such as birch and oak the moldings add significantly to the overall cost of new or remolded buildings. To appear most pleasing, only the highest grade and most costly woods without knots, defects or splices should be employed for the manufacture of wood moldings. Nonetheless, wood moldings manufactured from solid lumber are subject to warping and unpredictable changes in dimension as the moisture content of the molding changes.

To overcome these problems of material costs and dimensional instability, methods have been developed to apply thin wood veneers to substrates composed of low-cost wood particle board, lumber core and the like. Processes and the apparatus to practice them have been developed for wrapping thin veneers of approximately 1/42 inch around three sides of a rectangular substrate. The veneer-wrapped molding is applied around doorways and windows and has a back surface adjacent to a wall which is not fully veneered. In this way, the veneer, which is wrapped around the molding substrate so as to cover all four corners and the front and side faces, but leaving uncovered a portion of the back face, will appear from all visible faces to be constructed of solid wood.

Known methods of profile wrapping moldings include the steps of applying a hot melt glue such as ethylene vinyl acetate (EVA) to one side of a veneer, transporting that veneer by means of transport wheels and adhering the veneer to the substrate.

Two part methods of veneer profile wrapping moldings comprise the method of applying each part of a two part adhesive to the veneer to form a heat resistive coating between the veneer and the substrate.

Other known processes for veneer wrapping employing solvent based glues have been used in which the solvent-based glue is applied to both the veneer and the substrate and where the veneer is wrapped around the board using heat and pressure. Solvent based glues, however, are expensive and the nonaqueous solvent is dangerous to use.

A desirable attribute of veneer profile wrapped moldings is the ability to be used in damp or wet environments. In particular, the molding should be able to pass the American Society of Testing Methods (ASTM) D-3110 Wet Use (Type 1) test. This ASTM test subjects the veneer-wrapped molding to boiling water and vacuum pressure environments to test its ability to survive in a wet use environment. Hot melt glues, which are in widespread use in the industry, soften on exposure to heat and are not sufficiently tolerant to moisture and temperature change to survive this wet use test. Hot melt glues are also subject to a tendency to bleed through the veneer giving a blotchy look if the veneer is stained a dark color. Hot melt glues are also chemically affected by some stains and finishes that will soften the bond between the veneer and the substrate. Machining or routing the veneered substrates produced with hot melt glues reactivates the glue which then becomes gummy and accumulates on cutter or router heads.

Two-part glues have been developed to overcome some of the problems associated with hot melt glues. However, these glues are expensive and are still experimental.

Polyurethane hot melt glues have been developed to be employed in a wet use, but these glues are prohibitively expensive.

Another problem with known methods of profile wrapping substrates is that the veneer used must be quite thin, on the order of 0.024 inches thickness, in order to have sufficient flexibility to be successfully wrapped about the veneer substrate. The thinness of the veneer substrate and known veneer wrapped moldings has detrimental effects on the appearance of the veneer because the thickness limits the amount of finish sanding which may be performed, and hence, the final appearance of the wood grain.

What is needed is a method of veneer profile wrapping substrates which employs a cost-effective, safe, water-base glue system which forms a glue line which is resistant to heat and moisture. Further the method should increase the flexibility of the veneer prior to gluing to allow thicker veneers to be wrapped. There is also a need for a veneer-wrapped molding which can withstand wet use and which has a veneer wrapping which is sufficiently thick to allow finish sanding and an improved veneer appearance.

SUMMARY OF THE INVENTION

The veneer profile wrapping process of this invention employs a water base polyvinylacetate adhesive or glue system which is premixed before application with an acid catalyst. The polyvinylacetate ("PVA") glue is applied to the veneer by a roller applicator. The veneer is then transported on a vacuum belt which prevents the veneer from warping while the PVA glue is dried with fans and infrared radiation. The process of this invention employs a porous substrate such as particle board which is heated by infrared radiation on all sides. PVA glue is then applied to the surfaces which will be wrapped with veneer and the heat of the substrate plus additional infrared radiation and fans evaporate and dry the glue on the substrate. The glue on the substrate is dried for approximately 60 to 90 seconds by the use of cross-fed drying lines and the glue on the veneer is dried for approximately 10–15 seconds. The veneer is then inverted on a side belt changer and forced into intimate contact with the substrate. The dried glue on the veneer and the substrate are brought into intimate contact by heated metal rollers. After the metal rollers, rubber rollers apply pressure and heat guns and infrared lamps apply process heat which rapidly bonds the veneer to the substrate producing a bond with high green strength which may be almost immediately sanded or milled. This process produces a veneer-wrapped molding with a moisture-resistant glue line and a veneer which may be 0.030 inches or more in thickness.

An alternate embodiment of the method of this invention employs a water-base urethane dispersion adhesive system which is applied by means of spraying the veneer and a substrate which is nonporous, such as aluminum with the adhesive. The alternate embodiment which produces a veneer-wrapped molding with an impermeable substrate such as aluminum is otherwise similar to the first embodiment.

It is an object of the present invention to provide a veneer profile wrapping method which utilizes safe and cost-effective glue systems.

It is another object of the present invention to provide a veneer-wrapped substrate suitable for use in damp environments.

It is a further object of the present invention to provide a veneer profile wrapping process which is suitable for applying wood veneers to nonporous substrates.

It is also an object of the present invention to provide a veneer profile wrapping process which renders the veneer flexible and allows the wrapping of thicker veneers.

It is yet another object of the present invention to provide a veneer-wrapped nonporous substrate which is suitable for use in damp environments.

It is a yet further object of the present invention to provide a veneer-wrapped molding with improved visual appearance.

It is an additional object of the present invention to provide a veneer profiling method with a short forming zone which can process veneer-wrapped substrates at 50 to 100 feet per minute.

Further objects, features and advantages of the invention will be apparent from the following detailed description when taken in conjunction with the accompanying drawings.

BRIEF DESCRIPTION OF THE DRAWINGS

FIG. 5 is a schematic view of the steps of the veneer profile wrapping method of this invention.

FIG. 6 is a schematic view of the processes involving the substrate of the veneer profile wrapping process of this invention.

FIG. 7 is a schematic view of an alternative glue application step of the veneer profile wrapping method of this invention.

DESCRIPTION OF THE PREFERRED EMBODIMENT

Figure 1:
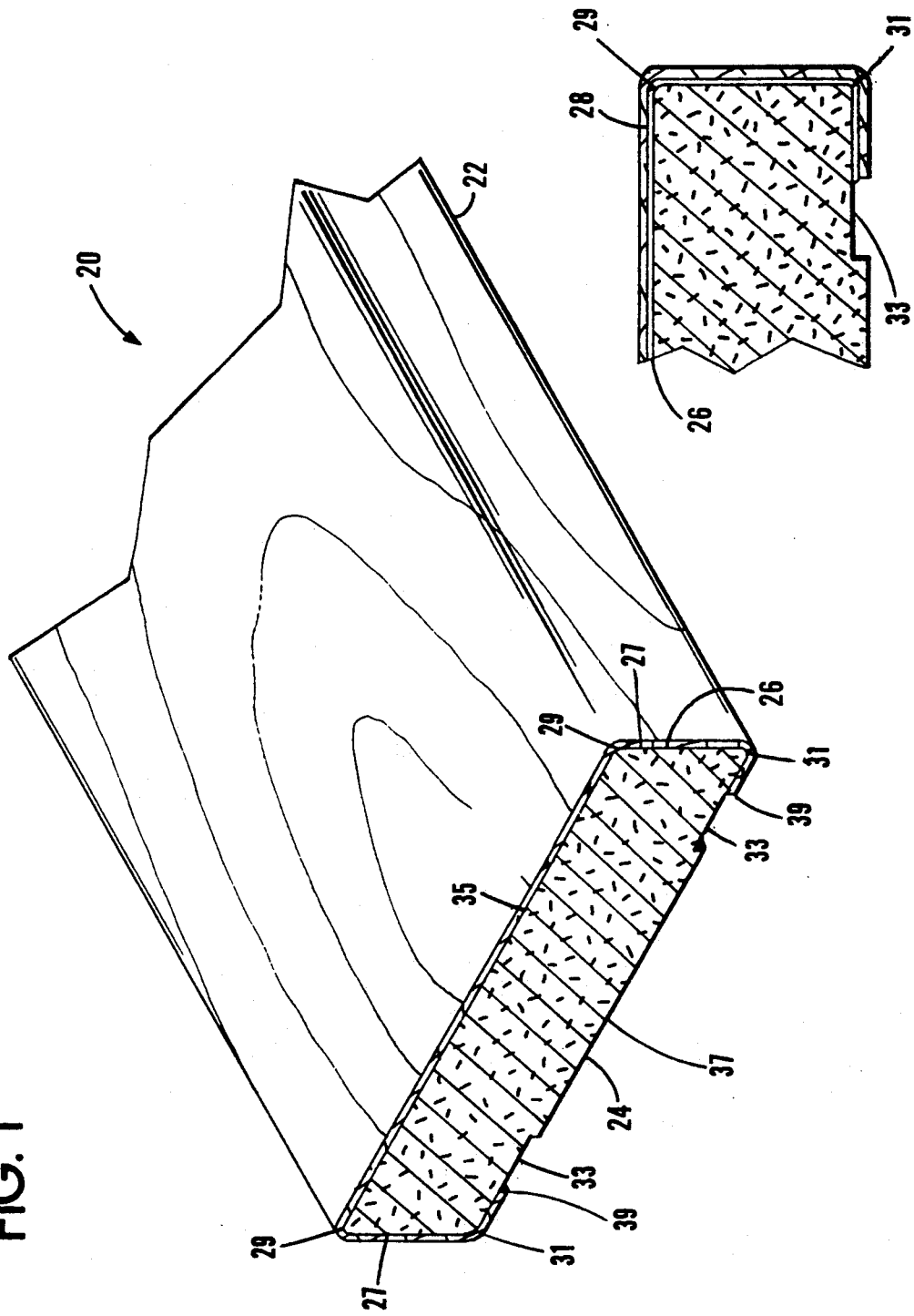
FIG. 1 is an isometric view of a veneer-wrapped porous substrate of this invention.
Figure 2:
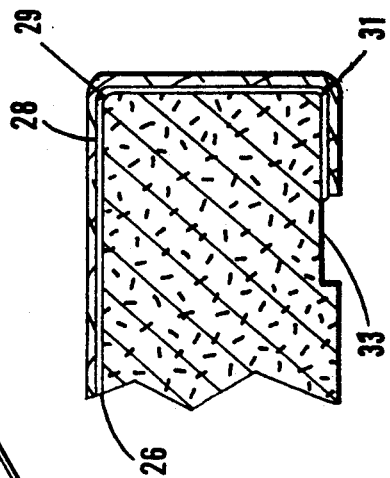
FIG. 2 is an enlarged fragmentary end view of the veneer-wrapped substrate of FIG. 1.

Referring more particularly to FIGS. 1-7 wherein like numbers refer to similar parts, the veneer-wrapped substrates are shown in FIGS. 1-4 and the veneer profile wrapping process is illustrated in FIGS. 5-7. As shown in FIGS. 1 and 2, at the product 20 produced by the process discloses herein is comprised of a wood veneer 22 which is formed around the top 35 and sides 27 of a substrate 24. The veneer 22 is bonded to the substrate 24, by a glue line 26. The glue line 26 is formed by two layers of polyvinylacetate glue which have been forced together by heat and pressure.

Although the polyvinylacetate glue is water based when applied, it forms a water resistant layer in the veneer profile wrapped product 20 because of an acid catalyst which is added to the glue before it is applied, which causes the glue 28 when applied to the product 20 to cross link or polymerize, forming a high-heat and moisture resistant compound. In the product 20, the substrate 24 is a permeable wood composition board such as particle board. The veneer 22 overlies and surrounds the substrate 24 and is separated only by the glue line 26, which is approximately 0.002 inches thick.

The wood veneer 22 which is bonded to the substrate 24 will preferably be about 0.030 inches thick. This is thicker than conventional profile wrapped moldings which conventionally have veneers of 0.024 inches thickness. Because the process used in producing the veneer profile wrapped product 20 increases the flexibility of the veneer 22 before it is wrapped around the substrate 24, a product 20 with a thicker veneer may be created. The use of thicker veneer allows the use of rotary cut veneer which is lower cost than sliced veneer. Rotary cut red oak veneer in particular has a grainy look which gives the appearance of solid lumber. Rotary cut red oak veneer has no fleck which is prevalent in sliced veneer. The presence of fleck gives an undesirable appearance to the veneer's surface that is caused by the angle at which the grain of the wood is cut. The thicker veneer, which the process disclosed herein allows to be profile wrapped, increases the amount which the veneer-wrapped product 20 may be finish-sanded, with a resultant improved appearance.

Because the process for manufacturing the veneer-wrapped product 20 renders the veneer 22 highly flexible during the wrapping process, the corners 29 near the top surface 35 of the product 20 may have a radius of curvature of 1/16 of an inch or less. The corners 31 adjacent to the bottom 37, where some limited cracking or checking will not effect performance, may be wrapped around an unradiused corner. The bottom 37 of the product 20 will preferably have inlet surfaces or lands 33 adjacent to the bottom corners 31 where the ends 39 of the wrapped veneer 22 are bonded. The lands 33 assure that the veneer is level with or below the back surface 37, so that when the produce 20 is mounted to a wall or surface, the back 37 of the substrate 24 is brought into contact with the wall or surface. The veneer is a single, unbroken piece across the width and around the sides of the wrapped substrate.

Figures 3, 4:
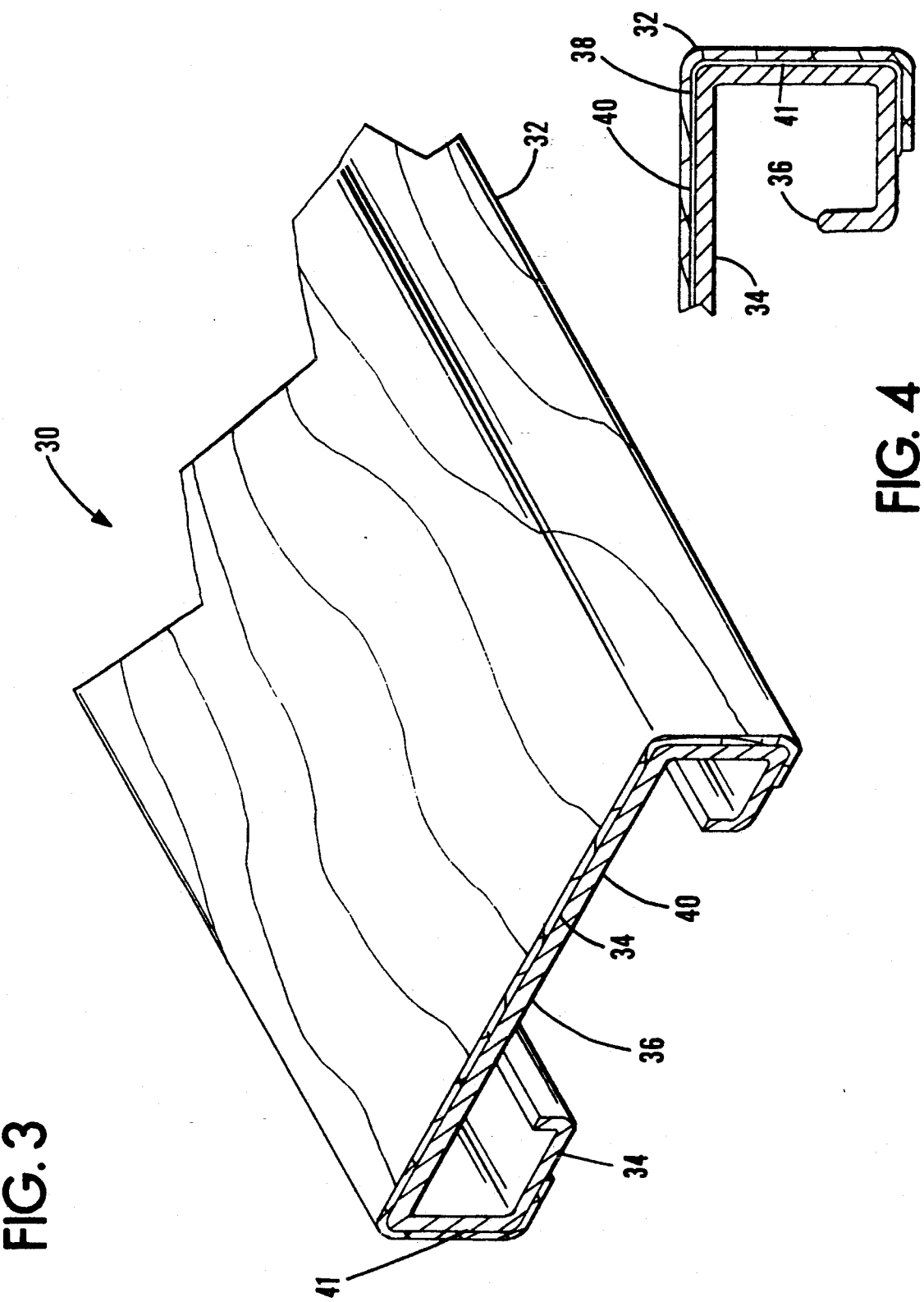
FIG. 3 is an isometric view of a veneer-wrapped nonporous substrate of this invention.
FIG. 4 is an enlarged fragmentary end view of the veneer-wrapped substrate of FIG. 3.

The process of this invention, if used with a water-base urethane dispersion adhesive can be used to create a product 30, shown in FIGS. 3 and 4, which has a veneer 32 profile wrapped to a nonporous substrate 34 such as aluminum. In some applications for molding sand the like, the mechanical properties such as the dimensional stability and strength of a material such as aluminum will be desirable and at the same time the pleasing appearance of wood may be desired. The produce 30 consists of an outer veneer 32 which is wrapped around a nonporous substrate such as an aluminum extrusion 36 and which is bonded to the nonporous substrate 34 by a water-base urethane dispersion adhesive 38 which forms a glue line 40 which has a thickness of approximately 0.0005 inches. The adhesive 38, which produces the glue line 40 and the profile wrapped molding 30 which is produced by using the adhesive 38, is resistant to heat and moisture. The product 30 employing a nonporous substrate has similar advantages to product 20, produced with a water-base polyvinylacetate glue system utilizing a porous substrate.

Referring now to FIGS. 5-7, a process for producing the veneer-wrapped products 20 and 30 is illustrated. The profile wrapping process utilizing water-base glue may be performed on a modified conventional profile wrapping apparatus, such as those manufactured by Duspohl, Friz, and Berg, all of the Federal Republic of Germany; Miraunka of Japan; and preferably Barberan SA of Spain.

Referring to FIG. 5, room temperature raw or unbacked veneer which may be either sliced veneer 42 or rotary cut veneer 44 is cut to length by a cutter 46. 0.0035 inches of Glue 48 is applied to the bonding surface 50 by a conventional glue spreader 52 which utilizes the surface tension of the glue 48 which adheres to a glue roller 54 which is then wiped onto the veneer bonding surface 50 as it passes beneath the roller 54. The preferred glue for the application of wood veneers to porous substrates by the process of this invention is a conventional water-base polyvinylacetate (PVA) glue which has a composition of polyvinylacetate in a suspension with water and has an acid catalyst mixed therewith. The preferred glue for use in this process is one specially formulated by H. B. Fuller Company, Inc., of St. Paul, Minn., and identified by Stock No. XR 2099, and is used with a catalyst, Stock No. 6320, from the same company.

After the veneer 51 passes through the glue spreader 52, it is transported on a vacuum belt 56 into close proximity to radiant heaters 58 and fans 60 which evaporate the moisture from the glue layer and heat the veneer and glue to 120° F. The vacuum transfer belt 56 is a rubber belt with small holes through which a vacuum is applied to clamp the veneer 51 to the belt as the veneer is transported.

To effectively carry out the process of this invention, the conventional veneer wrapping equipment as supplied by Barberan SA of Spain is modified in two ways. First, the vacuum is increased in the vacuum transfer belt 56 to be 30 percent to 50 percent stronger vacuum than is conventionally utilized on the equipment. The increased vacuum prevents the veneer 51 from warping or buckling as would normally result when a water-base glue is applied to the surface of a thin veneer. The vacuum also serves to draw moisture from the warm drying glue into the veneer to make the veneer more flexible.

The second modification required by the use of water-base glue is to increase the length of the vacuum transfer line and the heating ovens disposed there around diagrammatically illustrated as fans 60 and infrared heaters 58. The water-base glue system used herein requires heating on the order of 10-15 seconds for the veneer and 60 to 90 seconds on the substrate to produce the dry or tacky-dry glue film desired.

Application of a tacky-dry or dry glue film to the veneer 51 strengthens and provides a backing to the veneer. At the same time that the veneer is strengthened by the glue film, moisture from the water-base glue film increases the flexibility of the veneer. By increasing the strength and flexibility, the use of a glue film on the veneer eliminates the need for any fibrous backing material for the veneer.

This veneer profile wrapping process is capable of processing veneer at speeds to 50 to 100 feet per minute. The belts and drying ovens must have a length proportional to the veneer processing speed to allow sufficient drying time before the veneer reaches the forming zone 62.

The appropriate drying time is achieved without prohibitivly long drying ovens by using a cross-feed belt 56. Because the veneer is long and thin, changing its orientation so the long axis lies across a wide belt allows the use of a slow moving cross-fed belt for transporting the veneer 51 through the drying ovens 68. In this way the length of the drying ovens 68 is kept to reasonable dimensions.

The veneer is transferred from the vacuum belt 56 to a side belt changer 64 which employs a vacuum belt 74 for inverting the veneer so the glue side will face the substrate 66 when it enters the forming zone 62. The side belt changer is enclosed in an oven 67 which has fans 60 and infrared heaters 58. The conventional apparatus for producing veneer-wrapped molding, is modified in the veneer glue drying step performed in ovens 68, 67 of the process shown in FIG. 5 by the addition of sufficient process heat to produce a dry or tacky-dry PVA glue layer by the time the veneer 51 is fed into the forming zone 62. This will correspond to a veneer temperature of approximately 142° F. Because it is dried while vacuum clamped to a vacuum belt 56 and side belt 74, the veneer remains flat and unwarped. The higher vacuum required for the clamping of the veneer also results in the drawing of moisture into the veneer which renders it more pliable, which allows the wrapping of thicker veneers in the forming zone 62.

FIG. 6 shows a pictorial representation of the substrate 66 as it is prepared to be profile wrapped. The substrate 66 is first preheated on the top face 35 to 160° F., plus or minus 10° F. by heaters 76. The substrate 24 is then fed into a molder 77 which supplies the final shaping of the substrate 66. From the molder 77 the substrate 66 is heated on the bottom and sides to approximately 140°, plus or minus 10° F., by heat guns 79 employing hot air.

Glue 0.0035 inches thick is then spread on the top surface by a standard glue roller 80. A profile glue spreader with additional glue rollers which apply glue to the sides 27 and bottom of the substrate 66 is provided. The substrate is then moved to a drying area 78 which utilizes a cross feed belt system 81 which orients the substrates 66 as shown in FIG. 6 with their long axes perpendicular to the direction of material flow. The substrates then flow through the drying area until the glue has reached a dry or tacky-dry condition when the substrates are reorientated and fed into the forming zone 62. As the veneer and substrate are fed into the forming zone with glue sides opposed, the glue covered sides are brought into contact and pressure is applied with rubber rollers, together with chrome plated rollers which are heated with infrared heaters. The chrome rollers 84 have the effect of ironing the veneer onto the substrate. After the chrome rollers, the material flows into the second section of the forming zone where rubber rollers 90 press against and wrap the veneer around the lower edges of the substrate and where a series of eight heat guns heat the substrate and veneer to maintain it at a temperature of about 126° F. The forming zone is approximately 21 feet long and the glue covered surfaces rapidly bond together forming a material with a high green strength which may be subject to further shaping processes, such as sanding milling or cutting within 10 seconds of the bonding Processes, without disturbing the veneer. From the forming zone, the veneer-wrapped substrate is delivered to the sanding section 88 where the surface of the veneer is finish sanded.

By applying the glue to both the veneer and the substrate and pre-drying them before joining, attachment similar to a contact adhesive system is created with the advantages of an almost instantaneously obtained bond between the veneer and the substrate, without the cost and hazards associated with solvent-based glue systems.

There is not enough water left in the adhesive layer to wet and bond other surfaces but there is sufficient water to bond with the other adhesive layer. The bond so formed is superior to one produced with a hot melt glue system in resisting extremes of temperature and moisture.

The forming zone 62 of a veneer profile wrapping apparatus as shown diagrammatically in FIG. 5 is expensive to acquire and operate. The longer the zone is, the higher the cost. For a given veneer profile wrapping glue system, the time required in the forming zone will have a major impact on the overall cost of the equipment and the veneer profile wrapped molding produced. In the forming zone, the substrates are moving with their long axes parallel to the direction of motion and so if the molding is being processed at 100 feet per minute, 100 feet of forming zone is required for every minute of dwell time within the forming zone.

Veneer profile wrapping with water-base glue systems such as PVA have in the past proved prohibitively expensive because of the long dwell times required in the forming zone. The process of this invention, by pre-drying the glue on the substrate and the veneer and effecting a rapid bond between the veneer and the substrate with intense heat and pressure over a relatively short forming zone, has proven key to the successful use of water-base glue such as polyvinylacetate.

The process disclosed above can also be used with a water-base urethane dispersion adhesive system to bond wood veneers to nonporous substrates such as aluminum, plastic, fiberglass, and steel. The preferred glue for this process is one formulated by H. B. Fuller Company, Inc., and identified by Stock No. XR 2191 for the resin, and Stock No. XR 2152 for the catalyst. The catalyst is thoroughly mixed with the resin before the glue is applied to the veneer and substrate. The water-base urethane dispersion adhesive has a viscosity which precludes the use of conventional glue transfer rollers requiring that the glue be applied by spraying as shown in FIG. 7. Also, the optimum thickness of the wet glue for the water-base urethane dispersion adhesive is approximately 0.0015 inches, versus a thickness of 0.0035 inches for the PVA glue system.

In most cases, no forming will be required of the nonporous substrate so molder 77 which is shown in FIG. 6 will not be required.

When bonding wood veneer 32 to a non-porous substrate 34, such as aluminum, the substrate surface 41, best shown in FIG. 3, to be bonded will, in most cases, require some treatment to facilitate the adhesion of the water-base urethane dispersion adhesive. In the case of an aluminum substrate, the surface to which the wood veneer is to be applied may be anodized, alodined, primed, or painted.

The veneer profile wrapping process employing polyvinylacetate glue system may be used with any porous substrate. The type of substrate will depend on the end use of the product and may consist of various grades of Particle board or lumber core moldings and solid wood substrates.

Northern red oak and birch veneers with a rotary cut or plain cut may be advantageously wrapped according to the process disclosed herein. Pine veneers may also be employed. The process may be used with any suitable wood veneer.

It should be noted that while the process of this invention permits the use of veneers in excess of 0.030 inches thick, thinner veneers may also be bonded to substrates if desired.

It is understood that the invention is not confined to the particular steps and veneer-wrapped product herein illustrated and described, but embraces all such modified forms thereof as come within the scope of the following claims.

We claim:

1. A process for forming a veneer wrapped molding by wrapping a veneer over at least two sides of a porous substrate comprising the steps of:
   (a) applying a water-base polyvinyl acetate adhesive which contains an acid catalyst to the veneer,
   (b) drying the moisture from the adhesive applied to the veneer until the adhesive is at least tacky-dry by heating the adhesive with infrared radiation, heating and evaporating water from the adhesive with hot air, and driving at least a portion of the water in the adhesive into the veneer to increase the veneer flexibility and to facilitate wrapping of the veneer around the substrate;
   (c) applying the polyvinyl acetate adhesive to at lest two sides of the substrate;
   (d) drying the adhesive on the substrate until at least tacky-dry;
   (e) wrapping the veneer around the sides of the substrate which have adhesive applied thereto; and
   (f) bonding the veneer to the substrate by pressing the veneer and substrate together while heating the combination to rapidly form a high green strength bond which permits almost immediate finishing of the veneer wrapped substrate by sanding or milling.

2. A process for forming a veneer wrapped molding by wrapping a veneer over at least two sides of a porous substrate comprising the steps of:
   (a) clamping the veneer before applying an adhesive to prevent warping of the veneer;
   (b) applying a water-base polyvinyl acetate adhesive which contains an acid catalyst;
   (c) drying the moisture from the adhesive applied to the veneer until the adhesive is at least tacky-dry;
   (d) applying the polyvinyl acetate adhesive to at least two sides of the substrate;
   (e) drying the adhesive on the substrate until at least tacky-dry;
   (f) wrapping the veneer around the sides of the substrate which have adhesive applied thereto; and
   (g) bonding the veneer to the substrate by pressing the veneer and substrate together while heating the combination to rapidly form a high green strength bond which permits almost immediate finishing of the veneer wrapped substrate by sanding or milling.

3. The process of claim 2 wherein the step of clamping the veneer comprises the steps of placing the veneer over a surface defining a multiplicity of apertures and drawing a vacuum on the veneer through the apertures, thus clamping the veneer in an unwarped condition, the vacuum also drawing moisture through the veneer from the water-base adhesive thus drying the adhesive and increasing the flexibility of the veneer by increasing its moisture content.

4. The process of claim 3 wherein the veneer is bonded to the substrate while the veneer and substrate are in motion and further comprising the steps of:

(a) applying pressure against the veneer on the substrate with metal rollers heated by the infrared radiation; and (b) applying pressure against the veneer on the substrate with rubber rollers while heat guns apply process heat onto the substrate and the veneer.

5. The process of claim 3 wherein the veneer is at least 0.030 inches thick.

6. A process for forming a veneer wrapped molding by wrapping a veneer over at least two sides of a nonporous substrate comprising the steps of:

(a) applying a water base urethane dispersion adhesive to the veneer;

(b) drying the moisture from the adhesive applied to the veneer until the adhesive is at least tacky-dry by heating the adhesive with infrared radiation, heating and evaporating water from the adhesive with hot air, and driving at least a portion of the water in the adhesive into the veneer to increase the veneer flexibility and to facilitate wrapping of the veneer around the substrate;

(c) applying the urethane dispersion adhesive to at least two sides of the substrate;

(d) drying the adhesive on the substrate until at least tacky-dry;

(e) wrapping the veneer around the sides of the substrate which have adhesive applied thereto; and (f) bonding the veneer to the substrate by pressing the veneer and substrate together while heating the combination to rapidly form a high green strength bond which permits almost immediate finishing of the veneer wrapped substrate by sanding or milling.

7. A process for forming a veneer wrapped molding by wrapping a veneer over at least two sides of a nonporous substrate comprising the steps of:

(a) clamping the veneer before applying an adhesive to prevent warping of the veneer, (b) applying a water-base urethane dispersion adhesive to the veneer;

(c) drying the moisture from the adhesive applied to the veneer until the adhesive is at least tacky-dry;

(d) applying the urethane dispersion adhesive to at least two sides of the substrate;

(e) drying the adhesive on the substrate until at least tacky-dry;

(f) wrapping the veneer around the sides of the substrate which have adhesive applied thereto; and (g) bonding the veneer to the substrate by pressing the veneer and substrate together while heating the combination to rapidly form a high green strength bond which permits almost immediate finishing of the veneer wrapped substrate by sanding or milling.

8. The process of claim 7 wherein the step of clamping the veneer comprises the steps of placing the veneer over a surface defining a multiplicity of apertures and drawing a vacuum on the veneer through the apertures, thus clamping the veneer in an unwarped condition, the vacuum also drawing moisture through the veneer from the adhesive thus drying the adhesive and increasing the flexibility of the veneer by increasing its moisture content.

9. The process of claim 8 wherein the veneer is bonded to the substrate while the veneer and substrate are in motion and further comprising the steps of:

(a) applying pressure against the veneer on the substrate with metal rollers heated by infrared radiation; and (b) applying pressure against the veneer on the substrate with rubber rollers while heat guns apply process heat onto the substrate and the veneer.

10. The process of claim 8 wherein the veneer is at least 0.030 inches thick.

* * * * *